United States Patent [19]
Gabriel

[11] Patent Number: 5,661,968
[45] Date of Patent: Sep. 2, 1997

US005661968A

[54] APPARATUS FOR COOLING A GAS TURBINE IN A GAS AND STEAM TURBINE PLANT

[75] Inventor: Christian Gabriel, Moehrendorf, Germany

[73] Assignee: Siemens Aktiengesellschaft, Munich, Germany

[21] Appl. No.: 627,774

[22] Filed: Apr. 1, 1996

Related U.S. Application Data

[63] Continuation of PCT/DE94/01085 Sep. 19, 1994.

[30] Foreign Application Priority Data

Sep. 30, 1993 [DE] Germany ............................ 43 33 439.3

[51] Int. Cl.⁶ .............................. F02C 6/18; F02C 7/12
[52] U.S. Cl. ................................................. 60/39.182
[58] Field of Search ........................ 60/39.07, 39.181, 60/39.182, 39.75, 39.83

[56] References Cited

U.S. PATENT DOCUMENTS

| | | | |
|---|---|---|---|
| 4,424,668 | 1/1984 | Mukherjee | 60/39.182 |
| 5,185,997 | 2/1993 | Nishijima. | |
| 5,428,950 | 7/1995 | Tomlinson et al. | 60/39.182 |
| 5,491,971 | 2/1996 | Tomlinson et al. | 60/39.182 |

FOREIGN PATENT DOCUMENTS

| | | |
|---|---|---|
| 0106313 | 4/1984 | European Pat. Off.. |
| 0379880 | 8/1990 | European Pat. Off.. |
| 0519304 | 12/1992 | European Pat. Off.. |
| 0566868 | 10/1993 | European Pat. Off.. |
| 2749496 | 4/1979 | Germany. |
| 2034822 | 6/1980 | United Kingdom. |
| 2264539 | 9/1993 | United Kingdom. |

*Primary Examiner*—Louis J. Casaregola
*Attorney, Agent, or Firm*—Herbert L. Lerner; Laurence A. Greenberg

[57] ABSTRACT

A combined gas-turbine and steam-turbine plant includes waste-heat steam generator which is located downstream of the gas turbine. The heating surfaces of the waste-heat steam generator are connected in a water/steam loop of the steam turbine. The gas turbine is cooled and the heat obtained in that heat exchange is further utilized. An intermediate circuit is linked to a first heat exchanger which cools the coolant of the gas turbine and to a second heat exchanger which is connected in the water/steam loop.

9 Claims, 1 Drawing Sheet

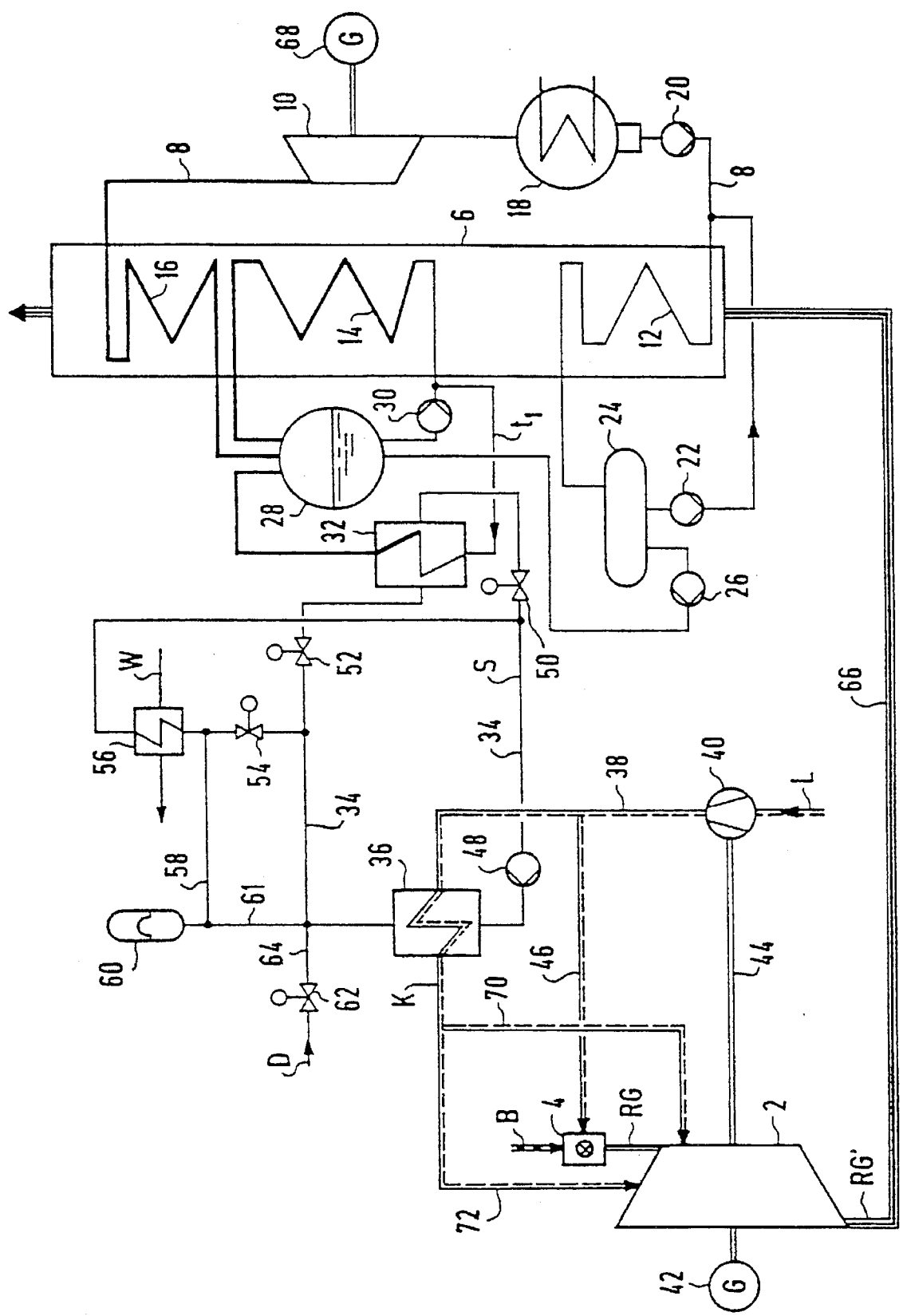

APPARATUS FOR COOLING A GAS TURBINE IN A GAS AND STEAM TURBINE PLANT

CROSS-REFERENCE TO RELATED APPLICATION

This is a continuation of international application PCT/DE94/01085, filed Sep. 19, 1994, which designated the United States.

BACKGROUND OF THE INVENTION

1. Field of the Invention

The invention relates to an apparatus for cooling the coolant of the cooled gas turbine of a gas-turbine and steam-turbine plant; the latter comprises a waste-heat steam generator downstream of the gas turbine with heating surfaces which are connected into a water/steam loop of the steam turbine, and in which a first heat exchanger provided for cooling the coolant is linked to the secondary side of a second heat exchanger.

A gas-turbine and steam-turbine plant of this type is conventionally used for generating electrical energy. The aim is to provide an especially high temperature of the working medium at the inlet of the turbine of, for example, 1200° to 1500° C. so as to increase the power capacity of the gas turbine and therefore to achieve the highest possible efficiency. However, such a high turbine-inlet temperature entails material problems especially in respect of the heat resistance of the turbine blades.

2. Description of the Related Art

An increase in the turbine-inlet temperature is acceptable when the turbine blades are cooked to such an extent that they always have a temperature below the rated temperature limit of the turbine blade material. It has been known heretofore, for this purpose, from European patent specification EP 0 379 880 to branch off air compressed in a compressor assigned to the gas turbine and to cool the air serving as a coolant before the entry thereof into the gas turbine. It has also become known from European patent specification EP 0 519 304 A1 to use an air/water cooler for this purpose, by means of which the heat obtained during the cooling of the coolant is supplied to the water/steam loop via feed water used for this purpose. A disadvantage of this, however, is the increased outlay with respect to measurement and regulatory control, especially with regard to maintaining the necessary pressure and setting the quantity of the feed water extracted from the water/steam loop for coolant cooling. It has also become known from British Patent 2 264 539 A to transfer the heat obtained in cooling the coolant via an intermediate circuit to the feed water of the water/steam loop.

SUMMARY OF THE INVENTION

It is accordingly an object of the invention to provide an apparatus for cooling the coolant of the gas turbine in a gas-turbine and steam-turbine plant, which overcomes the above-mentioned disadvantages of the prior art devices and methods of this general type and which assures good gas-turbine cooling, and that, as a result of an especially effective utilization of the heat obtained thereby, superior overall efficiency of the gas-turbine and steam-turbine plant is ensured. Quite importantly, also, the foregoing objects are to be satisfied with the least possible technological outlay and as inexpensively as possible.

With the foregoing and other objects in view there is provided, in accordance with the invention, an improvement in the cooling of a gas-turbine of a gas-turbine and steam-turbine plant. The latter includes a gas turbine and a waste-heat steam generator having heating surfaces located downstream of the gas turbine and connected in a water/steam loop of a steam turbine. An apparatus is provided for cooling a coolant of the gas turbine. The apparatus comprises:

a water/steam separating tank connected to the evaporator heating surface of the waste-heat steam generator;

an intermediate circuit including a first heat exchanger for cooling the coolant of the gas turbine, and a second heat exchanger, the second heat exchanger having a primary side communicating with the water/steam separating tank and a secondary side communicating with the first heat exchanger.

In accordance with an added feature of the invention, the water/steam separating tank has a water side and a steam side, the primary side of the second heat exchanger having a primary side inlet communicating with the water side and a primary side outlet communicating with the steam side of the water/steam separating tank.

In other words, the objects of the invention are satisfied with the second heat exchanger which is connected on the primary side to the water/steam separating tank, which is connected to the evaporator heating surface.

The heat claimed by cooling the coolant and transferred to the gas-turbine and steam-turbine process via the intermediate circuit, i.e., via a closed separate cooling circuit, is thus used to generate steam. Due to the fact that the quantity of secondary medium present in the intermediate circuit remains constant, there is no need for volume regulationg. Because the water/steam circuit is uncoupled from the intermediate circuit in flow terms, the pumping capacity for conveying the secondary medium in the intermediate circuit is especially low.

The coolant for cooling the gas turbine is a fluid which can be liquid or gaseous. Compressed air from an air compressor assigned to the gas turbine is preferably used as a coolant.

Depending on the temperature level required, the second heat exchanger can be connected to different heating surfaces of the waste-heat steam generator. Expediently, the second heat exchanger connected into the intermediate circuit on the secondary side is connected on the primary side to a water/steam separating tank connected to a low-pressure evaporator heating surface. The water/steam separating tank is advantageously connected on the water side to the primary-side inlet and on the steam side with the primary side outlet of the second heat exchanger.

A suitable pump is connected upstream of the first heat exchanger disposed on the primary side of the intermediate circuit for conveying the secondary medium flowing in the intermediate circuit and cooling the coolant. Furthermore, the second heat exchanger is expediently preceded on the primary side by a pump for conveying the water or water/steam mixture (tertiary medium) flowing therethrough out of the water/steam loop.

A feed conduit opens into the intermediate circuit for the purpose of additionally introducing water, especially deionized water, into the otherwise closed cooling loop.

In order to guarantee a sufficient cooling effect even in the case of operationally reduced steam generation; especially in the case of pure gas-turbine operation (single-cycle operation), an auxiliary cooler parallel to the first heat exchanger can be connected into the intermediate circuit.

The advantages achieved by the invention are, in particular, that, by the use of two heat exchangers in a closed intermediate circuit, an especially suitable return of heat into the overall process, at the same time with a simple mode of operation and at low outlay in measuring and regulating terms, is possible. Moreover, there is no need for a coolant exchange, unless, by the use of the same system, the secondary medium of the intermediate circuit is to be exchanged for one of a different kind.

Other features which are considered as characteristic for the invention are set forth in the appended claims.

Although the invention is illustrated and described herein as embodied in an apparatus for cooling the coolant of a gas turbine in a gas-turbine and steam-turbine plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single figure of the drawing:

BRIEF DESCRIPTION OF THE DRAWING

The single FIGURE of the drawing is a diagrammatic view of a gas-turbine and steam-turbine plant with an apparatus for cooling the gas turbine coolant.

DESCRIPTION OF THE PREFERRED EMBODIMENTS

The gas-turbine and steam-turbine plant shown diagrammatically in the FIGURE, comprises a gas turbine 2 with an upstream combustion chamber 4 and with a waste-heat steam generator 6 which is located downstream on the gas side. Heating surfaces of the steam generator 6 are connected in a water/steam loop 8 of a steam turbine 10. The heating surfaces are, in particular, a low-pressure preheater 12, a low-pressure evaporator 14 and a low-pressure superheater 16.

Located downstream of the steam turbine 10 is a condenser 18 which is connected via a condensate pump 20 to the low-pressure preheater 12. The latter is connected on the outlet side and, via a circulating pump 22, on the inlet side to a feed-water tank 24. The feed-water tank 24 is connected on the outlet side, via a feed-water pump 26, to a water/steam separating tank 28. Connected to this water/steam separating tank 28 are the low-pressure evaporator 14, on the water side, via a pump 30, and the primary-side inlet of a (second) heat exchanger 32. The steam side of the water/steam separator 28 communicates with the low-pressure superheater 16 and the primary-side outlet of the heat exchanger 32. The heat exchanger 32 is thus connected in parallel to the low-pressure evaporator 14 via the water/steam separating tank 28.

The (second) heat exchanger 32 is connected on the secondary side into an intermediate circuit 34, into which the primary side of a (first) heat exchanger 36 is connected. The latter is connected on the secondary side into a cooling-air conduit 38 opening into the gas turbine 2.

The cooling-air conduit 38 is connected to an air compressor 40 assigned to the gas turbine 2. The air compressor 40 and an electrical generator 42 driven by the gas turbine 2 are seated on a common shaft 44. A branch 46 of the cooling-air conduit 38 opens into the combustion chamber 4 assigned to the gas turbine 2.

A pump 48 and two power valves 50, 52 are connected into the intermediate circuit 34. An auxiliary cooler 56 can be connected into the intermediate circuit 34 via the valves 50, 52 and via a further power valve 54. The intermediate cooler 56 communicates via a conduit 58 with a compensating tank 60. The latter is also connected directly to the intermediate circuit 34 via a conduit 61. Moreover, a feed conduit 64 for additional water D (e.g. deionized water), provided with a valve 62 opens into the intermediate circuit 34.

When the gas-turbine and steam-turbine plant is in operation, fuel B is supplied to the combustion chamber 4. In order to generate the working medium for the gas turbine 2, the fuel B is combusted in the combustion chamber 4 together with compressed air L conveyed through the branch 46 and coming from the air compressor 40. The hot working medium or flue gas RG which results from the combustion and which is under high pressure is expanded in the gas turbine 2. The flue gas thus does mechanical work by driving the gas turbine 2 and consequently the air compressor 40 and the generator 42. The expanded flue gas RG' emerging from the gas turbine 2 is introduced via a flue-gas conduit 66 into the waste-heat steam generator 6 and is utilized there to generate steam for the gas turbine 10. For this purpose, the flue gas stream and the water/steam loop 8 are oriented in counterflow relative to one another.

In order to achieve particularly good utilization of heat, there are conventionally produced steams at different pressure levels, the enthalpy of which is used for current generation in the steam turbine 10 driving a generator 68). In the exemplary embodiment, only the low-pressure stage is illustrated and described.

The expanded steam emerging from the steam turbine 10 passes into the condenser 18 and condenses there. The condensate is conveyed into the feed-water tank 24 via the condensate pump 20 and the low-pressure preheater 12. Some of the feed water is conveyed once more by means of the circulating pump 22, for further preheating, via the low-pressure preheater 12 and from there back into the feed-water tank 24. The preheated feed water is conveyed by means of the feed-water pump 26 out of the feed-water tank 24 into the water/steam separating tank 28. From there, the preheated feed water is guided via the pump 30 into the low-pressure evaporator 14, where it evaporates. The steam is separated from the remaining water in the water/steam separating tank 28 and is guided into the low-pressure superheater 16. The superheated steam passes from there into the steam turbine 10. The superheated steam is expanded in the steam turbine 10 and, at the same time, drives the latter and consequently the generator 68.

A partial flow $t_1$ of the preheated water from the water/steam separating tank 28 is guided via the heat exchanger 32, whereby the water evaporates at least partially. The heat necessary for this purpose is extracted from a secondary medium S flowing in the intermediate circuit 34. The steam or water/steam mixture generated in the heat exchanger 32 is likewise guided into the water/steam separating tank 28.

The secondary medium S of the intermediate circuit 34 cooled during heat transfer in the heat exchanger 32 serves for cooling compressed air L which is supplied to the gas turbine 2 from the air compressor 40. The heat transfer from the compressed air to the secondary medium S takes place in the heat exchanger 36. The air L cooled in the heat exchanger 36, hereafter designated as cooling air K, is supplied both to the rotor blades of the gas turbine 2 via a conduit 70 and to the guide blades of the gas turbine 2 via a conduit 72.

Should an additional cooling of the cooling air K for the gas turbine 2 be necessary, for example when, as the result of a shut-down of the steam-turbine plant, a sufficient recooling of the secondary medium S is not guaranteed solely via the heat exchanger 32, the auxiliary cooler 56 is put into operation. For this purpose, the valves 50 and 52 are at least partially closed and the valve 54 is opened. A cooling medium W, for example water, is consequently supplied to the auxiliary cooler 56. Changes in volume of the secondary medium S within the intermediate circuit 34 are compensated through the compensating tank 60. Moreover, deionized water D can be supplied to the intermediate circuit 34 via the feed conduit 64.

The use of an intermediate circuit 34 with two heat exchangers 32 and 36 achieves two primary goals: On the one hand, the water/steam circuit 8 of the steam-turbine plant and the cooling system—represented essentially by the cooling-air conduit 38 and the heat exchanger 36—are decoupled in terms of medium flow, and on the other hand they are thermally coupled to one another. The outlay in measuring and regulating terms for the cooling system and for the intermediate circuit 34, as well as with regard to the required pumping capacity within the intermediate circuit 34, is thereby particularly low.

I claim:

1. In a gas-turbine and steam-turbine plant with a gas turbine and a waste-heat steam generator having heating surfaces located downstream of the gas turbine and connected in a water/steam loop of a steam turbine, the heating surfaces including an evaporator heating surface, an apparatus for cooling a coolant of the gas turbine, comprising:
   a water/steam separating tank connected to the evaporator heating surface of the waste-heat steam generator;
   an intermediate circuit including a first heat exchanger for cooling the coolant of the gas turbine, and a second heat exchanger, said second heat exchanger having a primary side communicating with said water/steam separating tank and a secondary side communicating with said first heat exchanger.

2. The apparatus according to claim 1, wherein said water/steam separating tank has a water side and a steam side, said primary side of said second heat exchanger having a primary side inlet communicating with said water side and a primary side outlet communicating with said steam side of said water/steam separating tank.

3. The apparatus according to claim 1, wherein said intermediate circuit further includes a pump for conveying a medium in said intermediate circuit, said pump being connected upstream of said first heat exchanger as seen in a flow direction of the medium within said intermediate circuit.

4. The apparatus according to claim 1, wherein said water/steam loop includes water as a tertiary medium, and including a pump connected upstream of said second heat exchanger, as seen in a flow direction through said second heat exchanger, for conveying the water serving as a tertiary medium out of the water/steam loop.

5. The apparatus according to claim 1, including a feed conduit communicating with said intermediate circuit for feeding additional water into said intermediate circuit.

6. The apparatus according to claim 1, including a feed conduit communicating with said intermediate circuit for feeding deionized water into said intermediate circuit.

7. The apparatus according to claim 1, including an auxiliary cooler selectively connectible into said intermediate circuit.

8. The apparatus according to claim 1, including a compensating tank connected in said intermediate circuit.

9. A gas-turbine and steam-turbine plant, comprising:
   a coolant-cooled gas turbine generating waste heat;
   a waste-heat steam generator receiving the waste heat from said gas turbine, said waste-heat steam generator including heating surfaces connected in a water/steam loop of a steam turbine; and
   a cooling system for cooling a coolant of said gas turbine, said cooling system including a water/steam separating tank connected to one of the heating surfaces of said waste-heat steam generator, an intermediate circuit with a first heat exchanger for cooling the coolant of said gas turbine, and with a second heat exchanger, said second heat exchanger having a primary side communicating with said water/steam separating tank and a secondary side communicating with said first heat exchanger.

* * * * *